(12) United States Patent
Loeffler et al.

(10) Patent No.: US 7,778,762 B2
(45) Date of Patent: Aug. 17, 2010

(54) METHOD FOR OPERATING A SELF-IGNITING INTERNAL COMBUSTION ENGINE AND CORRESPONDING CONTROL DEVICE

(75) Inventors: Axel Loeffler, Backnang (DE); Wolfgang Fischer, Gerlingen (DE); Roland Karrelmeyer, Bietigheim-Bissingen (DE); Gerald Graf, Gaertringen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/399,917

(22) Filed: Mar. 6, 2009

(65) Prior Publication Data
US 2009/0228190 A1 Sep. 10, 2009

(30) Foreign Application Priority Data
Mar. 7, 2008 (DE) ........................ 10 2008 000 552

(51) Int. Cl.
*F02M 51/00* (2006.01)
*F02D 41/30* (2006.01)
(52) U.S. Cl. ...................... 701/103; 123/472; 123/90.11
(58) Field of Classification Search ................. 701/103; 123/472, 479, 480, 490, 90.11
See application file for complete search history.

(56) References Cited

U.S. PATENT DOCUMENTS

| 6,644,274 | B2 * | 11/2003 | Hasegawa et al. ...... 123/406.41 |
| 7,231,289 | B2 * | 6/2007 | Damitz et al. ................ 701/104 |
| 7,254,473 | B2 * | 8/2007 | Kojima et al. ................ 701/105 |
| 7,257,479 | B2 * | 8/2007 | Damitz et al. ................ 701/105 |
| 7,305,872 | B2 * | 12/2007 | Schueler et al. ........... 73/117.03 |
| 7,334,561 | B2 * | 2/2008 | Neunteufl et al. ............ 123/295 |
| 7,334,567 | B2 * | 2/2008 | Kassner ....................... 123/399 |
| 7,366,605 | B2 * | 4/2008 | Schueler et al. ............. 701/103 |
| 7,383,116 | B2 * | 6/2008 | Damitz et al. ................ 701/102 |
| 7,661,408 | B2 * | 2/2010 | Kassner ....................... 123/435 |
| 2006/0064230 | A1 | 3/2006 | Damitz et al. |
| 2009/0182483 | A1 * | 7/2009 | Loeffler et al. .............. 701/103 |

FOREIGN PATENT DOCUMENTS

DE 10 2004 046 086 3/2006

\* cited by examiner

*Primary Examiner*—Hai H Huynh
(74) *Attorney, Agent, or Firm*—Kenyon & Kenyon LLP

(57) ABSTRACT

Operating a self-igniting internal combustion engine includes: specifying a setpoint combustion position and a setpoint combustion noise feature; operating at least one cylinder of internal combustion engine for at least one cycle while maintaining a first injector control variable and/or an air valve control variable and a second injector control variable and/or a second air valve control variable; ascertaining actual combustion position and actual combustion noise feature of the at least one cylinder; comparing the actual combustion position to the setpoint combustion position and, in case the actual combustion position deviates from the setpoint combustion position, determining anew the first injector control variable and/or the air valve control variable; and comparing the actual combustion noise feature to the setpoint combustion noise feature and, in case the actual combustion noise feature deviates from the setpoint combustion noise feature, determining anew the second injector control variable and/or the air valve control variable.

10 Claims, 8 Drawing Sheets

METHOD FOR OPERATING A SELF-IGNITING INTERNAL COMBUSTION ENGINE AND CORRESPONDING CONTROL DEVICE

CROSS-REFERENCE TO RELATED APPLICATIONS

The present application claims priority to German Application No. 10 2008 000 552.5, filed in the Federal Republic of Germany on Mar. 7, 2008, which is expressly incorporated herein in its entirety by reference thereto.

FIELD OF THE INVENTION

The present invention relates to a method for operating a self-igniting internal combustion engine. Furthermore, the present invention relates to a control device for operating a self-igniting internal combustion engine.

BACKGROUND INFORMATION

German document no. DE 10 2004 046 086 A1 recites a method and a device for controlling an internal combustion engine. In this context, starting from a comparison of a variable which characterizes the combustion process in at least one cylinder, at least one control variable is determined for controlling the combustion process, using a specified setpoint value. The control variable may be, for example, a trigger time or an air mass.

New Otto engine combustion methods, which are frequently also designated as gasoline HCCI methods (homogeneous charge compression ignition) or CAI methods (controlled auto-ignition), differ from the usual externally supplied ignition in that the ignition of the fuel is not triggered using externally supplied ignition, as for instance, by a spark plug, but is based on a mixture of a fuel and an introduced exhaust gas having an elevated temperature. Before the ignition, the formation of a homogeneous mixture takes place. This leads to a plurality of exothermic centers in the combustion chamber. That being the case, the combustion of the fuel takes place uniformly and rapidly. In addition, the combustion temperature in the HCCI method is below the combustion temperatures of the usual external auto-ignition methods. The new Otto engine combustion methods therefore stand out compared to the usual external auto-ignition methods because of lower fuel consumption and reduced untreated pollutant emission. One may do without a relatively costly exhaust gas aftertreatment system, such as the use of an $NO_x$ adsorption catalyst, in the HCCI method.

Self-igniting internal combustion engines, which are frequently also designated as CAI engines, are equipped with a variable valve operation and direct fuel injection, as a rule. With regard to the valve operation, the distinction is particularly made between fully variable and partially variable valve operations. A fully variable valve operation is ensured, for instance, by an EHVS (electrohydraulic valve control). One cost-effective alternative is represented by a partially variable valve operation, such as camshaft-controlled valve operation having 2-point valve lift and a phase shifter.

During operation of a self-igniting internal combustion engine, a relatively large residual gas quantity is retained in the cylinder, which takes care of the initiation of combustion during the compression phase. For example, using valve overlap, after the start of a combustion cycle, a certain residual gas quantity is able to be held in the cylinder for the following cycle. This is also referred to as a retained or an internal exhaust gas quantity for the following intermediate compression. Alternatively, the residual gas may also be returned externally or sucked back by the brief opening of the starting valve during the intake phase. In both cases, this is referred to as a returned or external exhaust gas quantity.

The combustion position of a self-igniting fuel combustion is frequently given using a crank angle. One would preferably designate thereby a specific energy turnover of the combustion. As an example, the combustion position is given as the combustion center point MFB50 (mass fraction burnt 50%).

However, in a self-igniting internal combustion engine, the direct trigger is lacking for initiating combustion, such as, for example, an ignition spark of a spark plug. For this reason, relatively large differences with respect to the course of the combustion may occur that are individual to each cylinder.

However, during combustion in a self-igniting internal combustion engine, deviations with respect to the combustion position that may occur must be only slight. If, for instance, combustion is too late, it becomes unstable, and may cause durable interruption in the combustion. On the other hand, if the combustion takes place too early, the exhaust gas for igniting the fuel in the following combustion cycle cools off too rapidly. In addition, these problems add up significantly if, for example, in one cylinder of an internal combustion engine the combustion sets in too early and in another cylinder of the internal combustion engine the combustion sets in too late. In addition, the untreated emission and the specific fuel consumption also demonstrate a strong, nonlinear dependence on the combustion position of a cylinder. This has the effect, for example, that the earliest cylinder emits more additional nitrogen oxides than are saved as a result of a later ignition of the latest cylinder.

It is therefore desirable, when operating a self-igniting internal combustion engine, to have available the possibility of reducing deviations (between the cylinders and to a specified setpoint value) with respect to the course of combustion.

SUMMARY

Embodiments of the present invention provide a method for operating a self-igniting internal combustion engine and a control device for operating a self-igniting internal combustion engine.

Embodiments of the present invention are based on the realization that there is a relationship between the combustion position of a self-igniting combustion and the actual combustion noise feature that occurs during the process. An unacceptable actual combustion noise feature indicates that the combustion has taken place too early. In order to maintain a desired setpoint combustion position, it is therefore advantageous to establish at least one air valve control variable for controlling the self-igniting combustion, while taking into account the actual combustion noise feature. For instance, one may take the term actual combustion noise feature to mean the loudness level of the combustion noise. An actual combustion noise feature is easier to detect if a time characteristic of the pressure during the combustion phase of the self-igniting internal combustion engine is used for this. In this case, for example, the actual combustion noise feature may be the maximum pressure gradient during the combustion phase.

The combustion position may be captured, for instance, via a cylinder pressure signal. Cylinder pressure signals offer a reliable possibility for ascertaining the combustion position, such as the MFB50, the combustion time, the indicated combustion torque, the maximum cylinder pressure gradient or other characteristic features of the combustion. By combustion position, one should therefore understand not only MFB50, but a characteristic feature of the combustion, which may be ascertained via the cylinder pressure signal. Such a combustion position is of great importance with respect to the fuel consumption and the pollutant emission, especially the untreated $NO_x$ emission, when operating the self-igniting internal combustion engine.

The usually occurring differences in combustion noises, individually for each cylinder, are able to be minimized using the present invention. The usually occurring differences in the combustion noises, individual for each cylinder, may be attributed, for instance, to a different temperature response of the individual cylinders in the internal combustion engine, to fresh air metering that is not maintained constant, to a specimen-to-specimen scattering as well as to individual ageing effects of the injectors or valve actuating components of the individual cylinders.

In an embodiment, the minimizing of the differences in the combustion noises, individual for each cylinder, ensures a reduction in the untreated emissions and in the specific fuel consumption, particularly at higher partial loads. Thus, the earliest cylinder frequently emits more nitrogen oxides additionally than one saves at the latest cylinder, in relation to the rated point.

In an embodiment, the setpoint combustion noise feature, for instance, a desired maximum pressure gradient, is specified to be as low as possible in this instance. It is desirable to operate the internal combustion engine in such a way that combustion noises in the driver compartment are negligible, or rather are not perceived as being disturbing. Consequently, in addition to stabilizing the CAI combustion, embodiments of the present invention offer an improvement in driving comfort because of soft combustion noises.

For example, a maximum pressure gradient in the at least one cylinder of the internal combustion engine is determined as the actual combustion noise feature. The maximum pressure gradient is easy to determine.

In an embodiment, the first injector control variable and/or air valve control variable preferably includes an injection position of a pilot injection and/or a main injection. Using these control variables, the combustion position in a CAI operation is able to be influenced reliably.

In a further embodiment, the method includes the following steps: specifying a third injector control variable and/or air valve control variable; additional maintaining of the third injector control variable and/or air valve control variable; comparing the newly determined first injector control variable and/or air valve control variable to a specified value range; and, in case the newly determined first injector control variable and/or air valve control variable lies outside the specified value range, determining again the third injector control variable and/or air valve control variable. In particular, the injector control variable and/or the air valve control variable, which is the injection position of the main injection and includes the third injector control variable and/or the air valve control variable, is the injection position of the pilot injection and/or a ratio of a pilot injection quantity and a main injection quantity. In this way, the method may be continued even in response to a saturation of the first injector control variable and/or the air valve control variable. Because of this, the controllability of the self-igniting combustion system may be kept up over a longer period, that is, for instance, during a change in the environmental parameters and particularly in response to ageing of the engine.

In an embodiment, the second injector control variable and/or the air valve control variable advantageously includes the pilot injection quantity, the main injection quantity and/or the sum of the pilot injection and the main injection quantity. With that, the actual combustion noise feature may be influenced in a targeted manner via the second injector control variable and/or the air valve control variable.

In a further embodiment, the method includes the additional steps: specifying an exhaust (gas) valve control variable, determining at least one standard deviation of the ascertained actual combustion positions, comparing the at least one determined standard deviation and/or the sum of the determined standard deviations to the at least one specified comparison value, and, if the at least one determined standard deviation and/or the sum of the determined standard deviations deviates from the at least one specified comparison value, redetermining the exhaust gas valve control variable. The exhaust gas valve control variable preferably includes an exhaust gas valve opening time, an exhaust gas valve closing time, an exhaust gas valve opening duration, an internal exhaust gas quantity and/or an external exhaust gas quantity.

In an embodiment, the stability of the combustion is improved using the intervention in the air system or the exhaust gas system of the self-igniting internal combustion engine. Consequently, the admixture of ethanol is able to be compensated for.

In an embodiment, the standard deviation of a combustion feature (that is, to be ascertained statistically over several combustion cycles) supplies information on the stability of combustion. For this, one may preferably draw upon the standard deviation of the combustion center point (MFB50), of the maximum pressure gradient and/or the maximum pressure in the combustion phase.

The advantages described in the above paragraphs also apply to a corresponding control device. In particular, the self-igniting internal combustion engine may be an Otto engine.

Another advantage of the combustion control being described here is the circumventing of usually occurring inaccuracies in stock sensors for combustion chamber pressure recording. These inaccuracies are frequently in the range of between 0.1 to 0.5 bar. This corresponds to a fuel deficiency of ca. 0.3 to 1.5 mg/lift. It is therefore advantageous to do without a fuel-quantity intervention for direct load regulation, for example, as a function of an average pressure, since this often leads corresponding errors in the corrected fuel quantity.

By contrast, by using the maximum pressure gradient, the reaction to a fuel-quantity intervention is able to be more sensitive. A fuel-quantity intervention as a function of the maximum pressure gradient is therefore connected with a lower risk of error than a fuel-quantity intervention as a function of an average pressure. In addition, a controller used for quantity correction may be designed to be slower than such a controller for a quantity correction as a function of the average pressure, because of the greater sensitivity of the maximum pressure gradient.

Embodiments of the present invention provide a method for operating a self-igniting internal combustion engine having the steps:

(a) specifying a setpoint combustion position;

(b) operating the internal combustion engine for at least one cycle using a specified injector control variable and a specified exhaust gas valve control variable for at least one cylinder;

(c) ascertaining an actual combustion position of the at least one cylinder;

(d) comparing the actual combustion position to the setpoint combustion position;

(e) operating the internal combustion engine for at least one cycle using a changed specified injector control variable and a changed specified exhaust gas valve control variable for at least the one cylinder, if the actual combustion position deviates from the setpoint combustion position; and (f) repeating steps c) through e) at least once.

Embodiments of the present invention provides a control device for operating a self-igniting internal combustion engine having an output device designed to specify a setpoint combustion position, an injector control variable and an exhaust gas valve control variable; an injector control device and an exhaust gas valve control device which are designed so as to control an injector and an exhaust gas valve in such a way that, during the operation of the internal combustion engine for at least one cycle, the injector control variable and the exhaust gas valve control variable are satisfied; a comparing device that is designed to receive an actual combustion position of at least one cylinder determined by a sensor and to compare it to the specified setpoint combustion position and make available a corresponding comparison signal; and an evaluation device which, after receiving the comparison signal, is designed to redetermine the injector control variable and the exhaust gas valve control variable, if the actual combustion position deviates from the setpoint combustion position.

The method embodiment according to the present invention is used for cylinder equalization regulation, e.g., in stationary CAI engine operation, based on a signal concerning the combustion position, for instance, a cylinder pressure signal. The injector control variable is an injection time (SOI, start of injection), a pilot injection quantity (quantity of pilot injection), a main injection quantity (quantity of main injection), a ratio of the pilot injection quantity to the main injection quantity and/or an opening time and/or a closing time of the injector. The exhaust gas valve control variable is an opening position and/or a closing position of the exhaust gas valve (exhaust valve open/closed).

Embodiments of the present invention are based on the realization that the combustion position is able to be regulated by a carefully tuned control of the injector and of the exhaust gas valve during the operation of a self-igniting internal combustion engine. This makes it possible to compensate for engine-specific combustion properties. This relates, for instance, to a different temperature response of the respective engine and its individual cylinders, a different fresh air metering, a specimen-to-specimen scattering and/or individual ageing effects of the injectors or of the cylinders of the internal combustion engine. Moreover, using the present invention, the combustion position may be corrected with respect to different environmental conditions. Environmental conditions that may be corrected are, for example, fuel quality, atmospheric pressure and/or atmospheric temperature.

In an embodiment, the self-igniting internal combustion engine is an Otto engine. In the case of an Otto engine in particular, the CAI method has the effect of clearly reducing fuel consumption and significantly reduced exhaust gas emission with reference to critical pollutant components such as $NO_x$.

In an embodiment, the injector control variable and/or the exhaust gas valve control variable are specified individually for each cylinder. In this case, the injector control variable and/or the exhaust gas valve control variable, specified individually for each cylinder, is redetermined as a function of a deviation of the actual combustion position, determined for the appertaining cylinder, from the specified setpoint combustion position. In this way, individual cylinder ageing effects, for example, may easily be compensated for.

In an embodiment, as an alternative or in supplement to this, the injector control variable and/or the exhaust gas valve control variable may be specified to be the same for all the cylinders of the internal combustion engine. In doing this, one determines an average value that corresponds to the averaged actual combustion position of the various cylinders of the internal combustion engine, or the sum of the deviations of the actual combustion positions of all cylinders from the specified setpoint combustion position. The injector control variable and/or the exhaust gas valve control variable, that are specified the same for all the cylinders of the internal combustion engine, may then be redetermined as a function of a deviation of the average value from the specified setpoint combustion position or as a function of the sum. This ensures a rapid and reliable compensation for the environmental influences.

In an embodiment, it is assumed that, with respect to the air system, interventions individual to each cylinder are either not possible or not desirable. The reasons for this may be the use of a cost-effective, partially variable valve operation, for example. In this case, interventions individual to each cylinder are implemented via the injector control variable. An average drift of the combustion position, for instance, based on changed environmental conditions or on ageing effects, may be compensated for via the exhaust gas valve control variable. This happens, for instance, by a displacement in the valve control times.

In order to carry out the method according to an embodiment of the present invention, one may, of course, also use a fully variable valve control which permits interventions individual to each cylinder. The interventions individual to each cylinder may then be implemented via the exhaust gas valve control variable. The average drift of the combustion position is preferably corrected via the injector control variable, in this case.

In an embodiment, the setpoint combustion position is newly established, as long as the deviation of the determined actual combustion position or of the average value of the specified setpoint combustion position is greater than a specified maximum deviation. The danger of the occurrence of a control variable limitation for one of the cylinders may consequently be minimized.

The advantages described in the above paragraphs also apply to a corresponding control device.

Additional features and advantages of the present invention are elucidated in greater detail below, with reference to the drawings.

DETAILED DESCRIPTION

Figure 1:
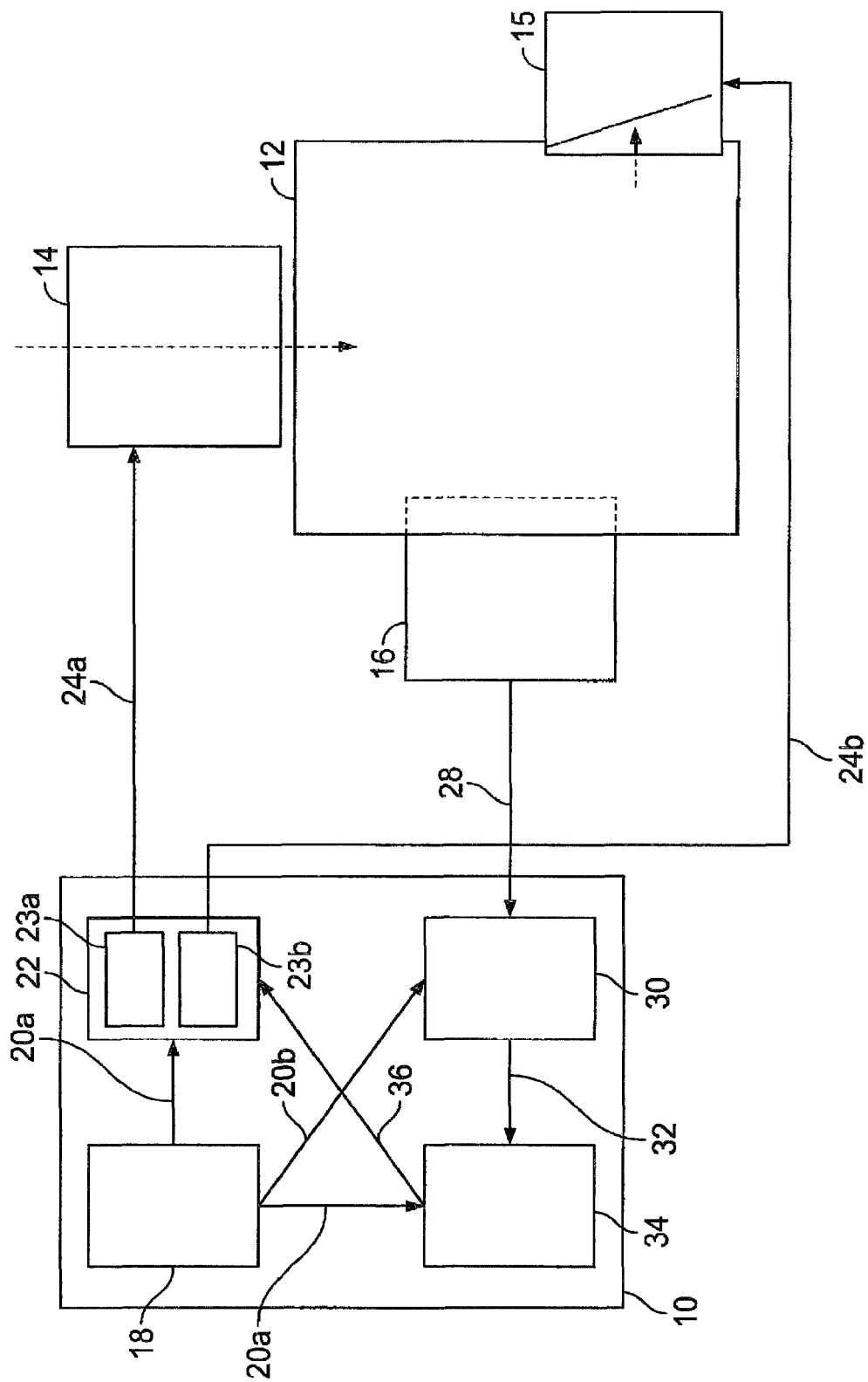
FIG. 1 is a schematic representation of a first specific embodiment of the control device for operating a self-igniting internal combustion engine.

FIG. 1 is a schematic representation of an embodiment of the control device for operating a self-igniting internal combustion engine. Control device 10 may be mounted close to a self-igniting internal combustion engine 12 having an injector 14, an exhaust gas valve 15 and a cylinder pressure sensor 16. Alternatively, control device 10 may also be a component of a central vehicle control system. In that case, control device 10 is connected to components 14, 15, 16 via signal lines and/or via a vehicle bus.

Control device 10 includes an output device 18 for providing a comparison value with respect to combustion position, an injector control variable and an exhaust gas valve control variable. In this instance, the comparison value is selected so that it corresponds to a preferred combustion position. The comparison may, for example, be the combustion center MFB50 (mass fraction burnt 50%) or a different crank angle for a specific energy turnover of a combustion.

The injector control variable may be, for example, an opening time and/or a closing time of the injector 14. The injector control variable may also indicate an injection position and/or an injection quantity. In this context, by injection position one should understand the point in time or the crank angle of a main injection.

In a corresponding manner, the exhaust gas valve control variable may correspond to at least one opening time and/or closing time of exhaust gas valve 15. The exhaust gas valve control variable thereby establishes the retained internal and/or the returned external exhaust gas quantity, using which a combustion is triggered in the CAI method.

In an embodiment, output device 18 may be designed for ascertaining a speed and/or a load of the appertaining vehicle, and for making available the comparison value, the injector control variable and/or the exhaust gas valve control variable as a function of the speed and/or the load. In the same way, output device 18 may also receive the speed and/or the load of the vehicle using a provided signal.

In the example of FIG. 1, output device 18 emits a data signal 20*a* using the injector control variable and the exhaust gas valve control variable to an injector control device and an exhaust gas valve control device 22 and to an evaluation device 34 of control device 10. The comparison value with respect to the combustion position is provided via data signal 20*b* to a comparison device 30. However, output device 18 does not have be developed as a compact unit. Instead, output device 18 may also include a plurality of subunits separated from one another, which are situated inside various components of control device 10.

Injector control device and exhaust gas valve control device 22 is designed to control injector 14 and exhaust gas valve 15 during at least one cycle of internal combustion engine 22, after receiving data signal 20*a*. For this purpose, injector control device and exhaust gas valve control device 22 includes an injector control unit 23*a* and an exhaust gas valve control unit 23*b*. In this context, injector control unit 23*a* controls injector 14 using control signal 24*a* in such a way that an injection time and/or an injection quantity that corresponds to the injector control variable is maintained. In the same way, exhaust gas valve control unit 23*b* takes care that an external and/or internal exhaust gas quantity, that corresponds to the exhaust gas valve control variable, is retained and/or returned by exhaust gas valve 15. This takes place via control signal 24*b*.

The previous paragraph may also mean that injector control unit 23*a* and exhaust gas valve control unit 23*b*, using control signals 24*a* and 24*b*, only emit the injector control variable and the exhaust gas valve control variable to injector 14 and exhaust gas valve 15. In this case, injector 14 and exhaust gas valve 15 are designed to control themselves corresponding to the control variables received.

Accordingly, during at least one following cycle, the injector control variable and the exhaust gas valve control variable are maintained for all cylinders of internal combustion engine 12.

Cylinder pressure sensor 16 is designed to measure the pressure prevailing inside the individual cylinders of internal combustion engine 12, using a relatively high time resolution. Cylinder pressure sensor 18 ascertains the respective combustion positions of the individual cylinders, with the aid of the measured pressure characteristics. For this purpose, one more (non-sketched) rotational speed signal is provided to cylinder pressure sensor 16. In this way, cylinder pressure sensor 16 is able to assign ascertained pressure values to the corresponding crank angle values. A corresponding sensor signal is subsequently emitted to control device 10.

Sensor signal 28 is received by comparison device 30 of control device 10. Comparison device 30 then compares the received combustion positions of the various cylinders to the comparison value of data signal 20*b*. In the process, comparison device 30 ascertains whether the received combustion positions lie within a specified deviation range about the comparison value. A corresponding comparison signal 32 is then emitted to an evaluation device 34. Comparison device 30 is, of course, also able to carry out the assignment of received pressure values to the corresponding crank angle values.

Evaluation device 34 is designed to redetermine the appertaining injector control variable and the exhaust gas valve control variable, when there is a deviation of at least one of the ascertained combustion positions from the specified comparison value. The redetermination of the injector control variable and the exhaust gas valve control variable may take place, in this context, individually for each cylinder and/or taking into account an averaged combustion feature of all the cylinders of internal combustion engine 12. Examples of redetermination of the injector control variable and the exhaust gas valve control variable are described in greater detail below.

The redetermined or the retained values for the injector control variable and the exhaust gas valve control variable are subsequently output again to injector control device and exhaust gas valve control device 22, using an output signal 36. Injector control and exhaust gas valve control device 22 subsequently continues operating injector 14 and exhaust gas valve 15 for at least one further cycle, in which the newly determined or the retained values are maintained for the injector control variable and the exhaust gas valve control variable. For instance, signal 20a may include a base value and signal 36 an appertaining correction.

After this at least one further combustion cycle, a combustion position may again be ascertained by cylinder pressure sensor 16 and output to comparison device 30 as sensor signal 28. This has the effect of making a renewed comparison of the newly measured combustion positions to the comparison value provided. If the newly measured combustion positions still lie outside the specified deviation range about the comparison value, a corresponding comparison signal 32 for redetermining the injector control variable and the exhaust gas valve control variable is again output to evaluation device 34. The process described in the above paragraphs may be repeated as often as desired.

Additional modifications able to be added to control device 10 shown, for its refinement, will be made clear to one skilled in the art with the aid of FIG. 2.

Figure 2:
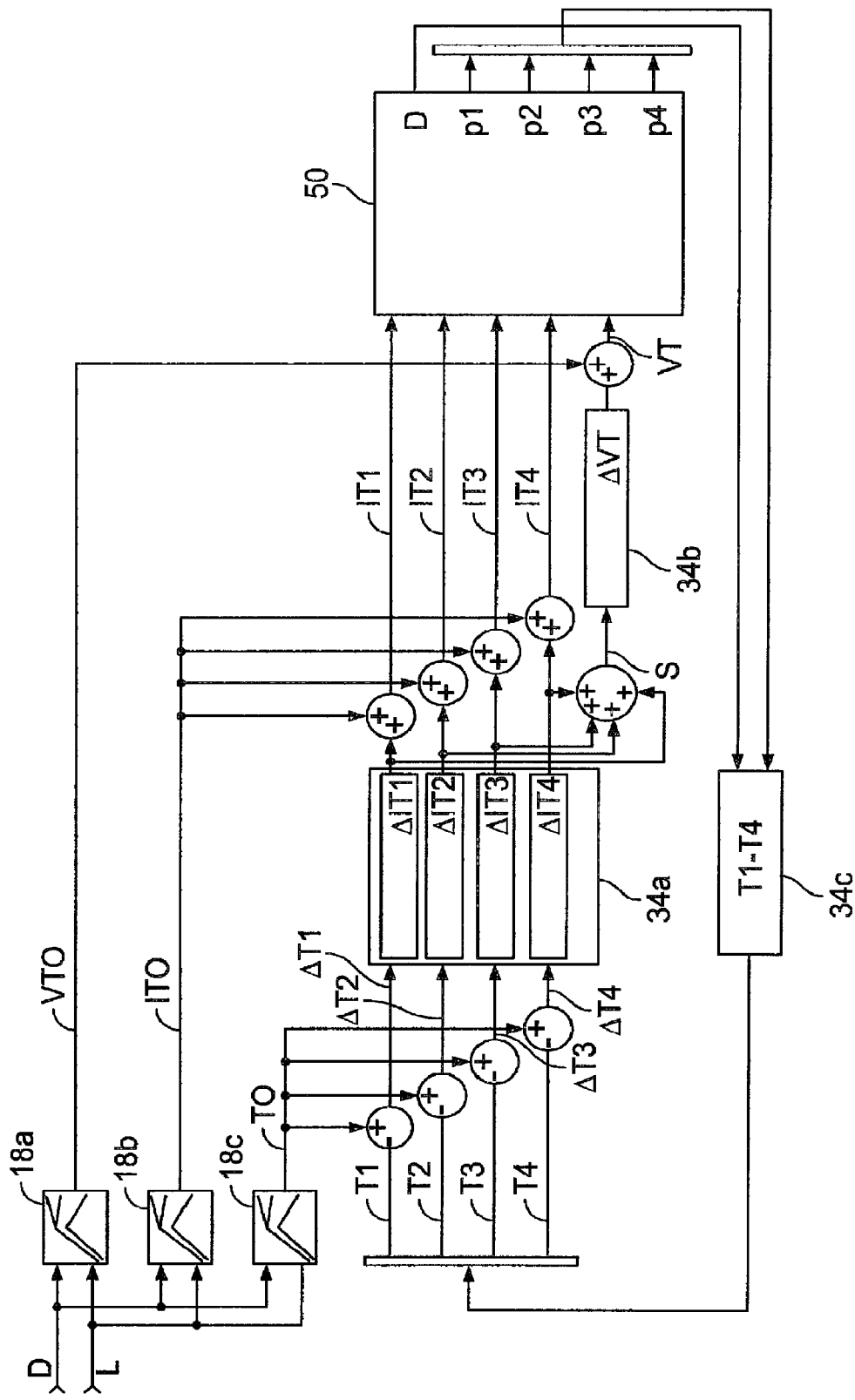
FIG. 2 is a block diagram of an embodiment of a method for setting a combustion position in operating a self-igniting internal combustion engine.

FIG. 2 shows a block diagram of a first specific embodiment of the method for operating a self-igniting internal combustion engine. The specific embodiment is adapted to a self-igniting internal combustion engine having four cylinders, such as an Otto engine having the CAI type of operation. However, the method for operating a self-igniting internal combustion engine is not limited to a specific number of cylinders.

In a first step of the method of FIG. 2, an initial valve control variable VT0, an initial injector control variable IT0 and a setpoint combustion position T0 are made available. This takes place, for example, via a vehicle-specific output device which includes three subunits 18a, 18b and 18c. Making available initial valve control variable VT0, initial injector control variable IT0 and setpoint combustion position T0 can take place, for example, during travel of the vehicle, as a function of rotational speed D and/or the load L.

In the case of the provided values for initial valve control variable VT0, initial injector control variable IT0 and setpoint combustion position T0, what is involved is an exhaust gas valve opening time, an exhaust gas valve closing time, an injector opening time, an injector closing time, an injection quantity, an injection position, a ratio between the pilot injection quantity and the main injection quantity, a combustion center point MFB50 (mass fraction burnt 50%) or another specific energy turnover of a combustion. The values are given as a crank angle, for example. The injection quantity is preferably established indirectly, by determining the injector opening time in ° KW or in seconds.

The method described herein is not limited to these examples. Any variable for controlling the injector during the filling of fuel into the internal combustion engine and for controlling the exhaust gas valve may be drawn upon instead, for carrying out the method.

In a second step, correction values $\Delta IT1$ to $\Delta IT4$ and $\Delta VT$ are provided. In this second step of the method, correction values $\Delta IT1$ to $\Delta IT4$ and $\Delta VT$ all amount to the value 0. Making available correction values $\Delta IT1$ to $\Delta IT4$ and $\Delta VT$ may take place by two subunits 34a and 34b of an evaluation device. The exact function of correction values $\Delta IT1$ to $\Delta IT4$ and $\Delta VT$ is discussed in greater detail below.

Correction values $\Delta IT1$ to $\Delta IT4$ are next each added to initial injection control variable IT0. This yields injector control variables IT1 to IT4, which, in this third step of the method, however, are equivalent to initial injector control variable IT0. In addition, correction value $\Delta VT$ to initial valve control variable VT0. Valve control variable VT obtained thereby is then provided to an engine control system 50, together with injector control variables IT1 to IT4. Engine control system 50 includes the self-igniting internal combustion engine having four cylinders, the appertaining injector, the appertaining exhaust gas valve, at least one cylinder pressure sensor for determining pressure characteristics p1 to p4 in the various cylinders of the internal combustion engine and at least one rotational speed sensor. When engine control system 50 receives valve control variable VT and injector control variables IT1 to IT4, engine control system 50 then controls the operation of the internal combustion engine for at least one combustion cycle, in such a way that the operating values appertaining to injector control variables IT1 to IT4 and to valve control variable VT are maintained. At the same time, engine control system 50 ascertains a new rotational speed D and the respective pressure characteristics p1 to p4 individually for each cylinder. The rotational speed D ascertained and pressure characteristics p1 to p4 ascertained individually for each cylinder are next passed on to subunit 34c of the evaluation device.

Subunit 34c of the evaluation device ascertains combustion positions T1 to T4 for the various cylinders of the internal combustion engine, with the aid of rotational speed D and pressure characteristics p1 to p4 individually for each cylinder. Subsequently, using setpoint combustion position T0 and the ascertained combustion positions T1 to T4 individually for each cylinder, deviations $\Delta T1$ to $\Delta T4$ are calculated. Deviations $\Delta T1$ to $\Delta T4$ correspond, in this instance, to the difference between setpoint combustion position T0 and the appertaining combustion positions T1 to T4 individually for each cylinder.

As a function of deviations $\Delta TI$ to $\Delta T4$, new correction values $\Delta IT1$ to $\Delta IT4$ are then determined by subunit 34a of the evaluation device, that was mentioned above. Thus, correction values $\Delta IT1$ to $\Delta IT4$ correspond to the corrections, individually for each cylinder, of injector control variables IT1 to IT4, with respect to deviations AT1 to AT4 of the ascertained combustion positions T1 to T4 of setpoint combustion position T0. Newly determined correction values $\Delta IT1$ to $\Delta IT4$ are then, in turn, added to the originally provided specified injector control variable IT0. In this manner, new values are calculated for injector control variables IT1 to IT4 individually for each cylinder.

In between, in an additional step, a sum S of correction values $\Delta IT1$ to $\Delta IT4$ is calculated. As a function of the calculated sum S, the correction value $\Delta VT$, that was mentioned before, is then determined by subunit 34b of the evaluation device. This correction device $\Delta VT$ is added to specified valve control variable VT0 to form valve control variable VT. Newly determined valve control variable VT is output to engine control system 50, together with injector control variables IT1 to IT4, individually for each cylinder, for at least one more cycle.

Engine control system 50 subsequently operates the internal combustion engine for at least one more cycle, the operator variables appertaining to newly determined variables IT1 to IT4 and VT being maintained. At the same time, a new rotational speed D and new pressure characteristics p1 to p4 are measured, individually for each cylinder. The method described may thereupon be repeated as often as desired. The interventions on the injector take place from cycle to cycle. The correction interventions on the injector may also, of course, be carried out at a lower frequency. The dynamics of the average value intervention in the air system and/or the exhaust gas valve may have a lower frequency as compared to the correction interventions on the injector, in order to avoid the cascading control systems from working against one another. In addition, a correction intervention may take place on the intake valve, individually for each cylinder, or one that is averaged over all combustion positions of the various cylinders.

In the embodiment shown in FIG. 2, a correction intervention, individually for each cylinder, is carried out via injector control variables IT1 to IT4 individually for each cylinder. This takes place via correction values ΔIT1 to ΔIT4 for injector control variables IT1 to IT4. At the same time, an overall intervention, that is, an intervention identical for all the cylinders, is made via valve control variable VT, for instance, a phase shift of the valve control times. In this context, combustion positions T1 to T4 are set equal, in order to regulate the average value of correction values ΔIT1 to ΔIT4 to the null value, using correction value ΔVT as a function of the sum S.

In an alternative to the described embodiment, corrections individually for each cylinder may be carried out using different valve control variables for the respective cylinders. In addition, a correction of the injector control variable may take place as a function of the sum over all correction values of the various valve control variables, individually for each cylinder. As an alternative to this, the correction of the injector control variable may also be carried out as a function of the deviations of the combustion positions of the various cylinders from a setpoint combustion position.

Furthermore, it is also conceivable to provide special measures for the case in which at least one of the correction values ΔIT1 to ΔIT4 and AVT goes into saturation. In such a situation, for instance, setpoint combustion position T0 for all cylinders may be tracked until all correction values ΔIT1 to ΔIT4 individually for each cylinder, free of the average, are able to be regulated to the null value again. This ensures the equalization of all the cylinders over a wider operating range.

To the extent that, using the method shown, service life effects are primarily to be compensated for, the additional possibility becomes available of storing correction values ΔIT1 to ΔIT4 as well as global correction value ΔVT, that were ascertained in the regulated state individually for each cylinder, in appropriate characteristics maps, in order to be able to use them directly for the control at a later time.

Figure 3:
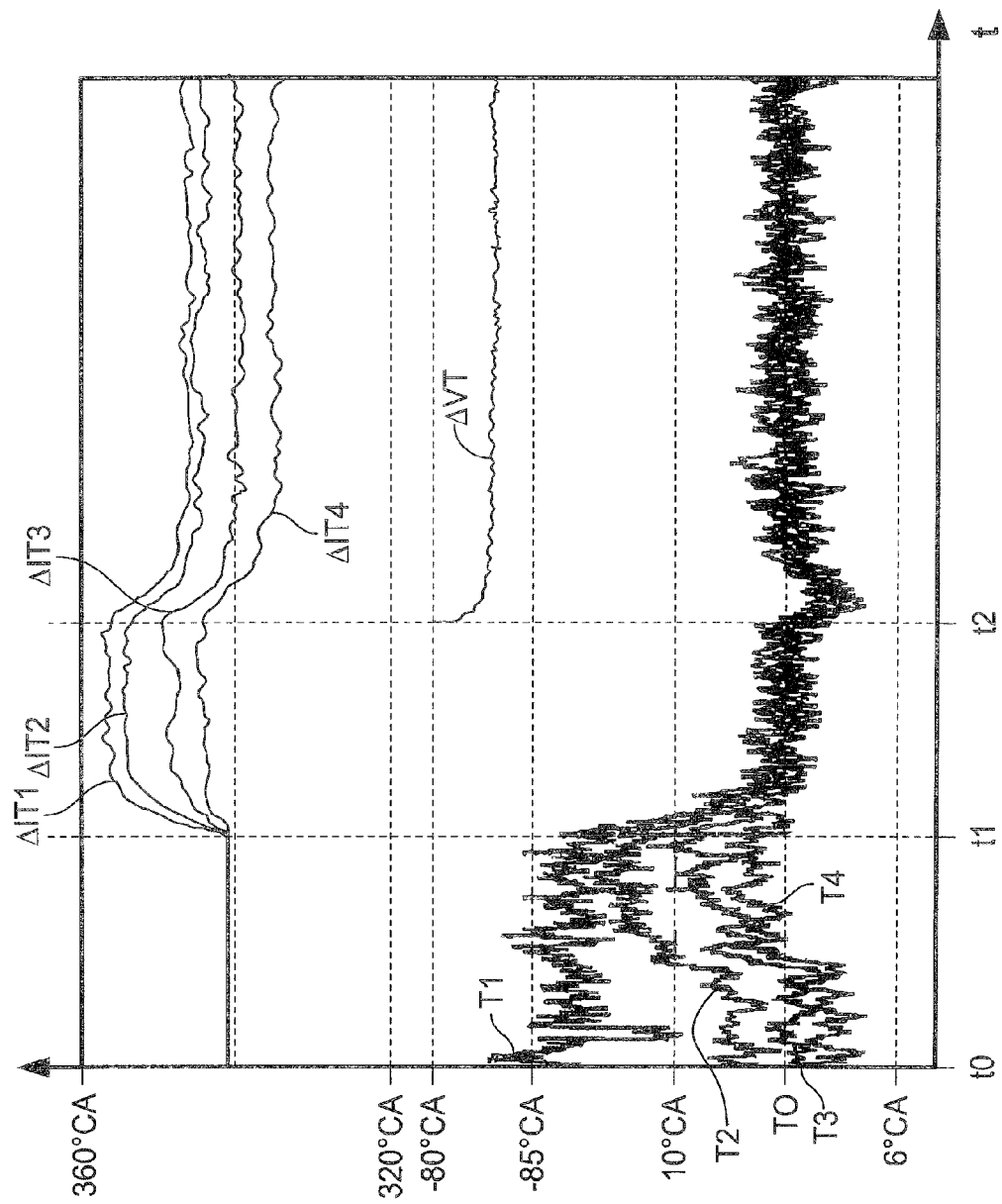
FIG. 3 shows an example coordinate system for a regulation individual to each cylinder of the injector control variables and an average value regulation of a valve control variable according to the method embodiment of FIG. 2.

FIG. 3 shows a coordinate system as example for a regulation individual to each cylinder of the injector control variables, and an average value regulation of a valve control variable according to the method of FIG. 2. The abscissa of the coordinate system shown is a time axis t. The ordinate of the coordinate system reflects the angles for the value ranges of measured curves T1 to T4, ΔIT1 to ΔIT4 and ΔVT shown.

Measured curves T1 to T4 reflect the combustion positions of the individual four cylinders of the self-igniting internal combustion engine, individually for each cylinder. These combustion positions T1 to T4, individually for each cylinder, are ascertained as MFB50 for ten combustion cycles in each case, using a cylinder pressure sensor. The value ranges of combustion positions T1 to T4, individually for each cylinder, lie within a range between 6° CA and 12° CA after the top dead center of the ignition, in this instance.

Measured curves ΔIT1 to ΔIT4 correspond to correction values ΔIT1 to ΔIT4 of injector control variables IT1 to IT4, which are determined as a function of combustion positions T1 to T4 of a preceding combustion cycle and a specified injector control variable IT0, individually for each cylinder. The value range of correction values ΔIT1 to ΔIT4 lies between 320° CA and 360° CA.

Measured curve ΔVT lies within a value range of −85° CA to −80° CA. The latter comes about from correction values ΔVT of valve control variable VT for the exhaust-camshaft adjuster, which are determined using average value regulation, as was described above.

Within a time period between times t0 to t1, the engine control system is controlled in such a way that a specified valve control variable VT0 and a specified injector control variable IT0 are strictly maintained. As may be seen with the aid of measured curves T1 to T4, large deviations occur in this context between individual combustion positions T1 to T4 of the various cylinders. It may be seen that, for none of the four cylinders does combustion position T1 to T4 lie close to the desired setpoint combustion position T0 at ca. 8° CA. At time t1, the previously described regulation, individually for each cylinder, of correction values ΔIT1 to ΔIT4 of injector control variables IT1 to IT4 is begun. However, up to time t2, no correction ΔVT is carried out of valve control variable VT with respect to the exhaust-camshaft adjuster. As may be seen, the values for combustion positions T1 to T4 of the various cylinders level out about desired setpoint combustion position T0 at 8° CA, beginning at time t1. However, one may determine, with the aid of measured curves ΔIT1 to ΔIT4, that for this, especially in the case of the first cylinder, to which curve ΔIT1 is assigned, a relatively large correction ΔIT1 of injector control variable IT1 has to be carried out. There is therefore the risk that, in response to the continuation of the ageing process of the first cylinder, a time is reached at which, even using a maximum possible correction ΔIT1 of injector control variable IT1, the appertaining combustion position T1 of the first cylinder cannot be corrected any longer to desired setpoint combustion position T0.

In an embodiment, in order to prevent this from happening, one begins at time t2 with the average value regulation of correction value ΔVT of valve control variable VT with respect to the exhaust-camshaft adjuster. In this way, the deviations of corrections ΔIT1 to ΔIT4 of injector control variables IT1 to IT4, individually for each cylinder, may be reduced. This ensures that, even while the ageing process is continuing in the various cylinders or in response to unfavorable environmental conditions, combustion positions T1 to T4 of the various cylinders are able to be corrected to desired setpoint combustion position T0.

Figure 4:
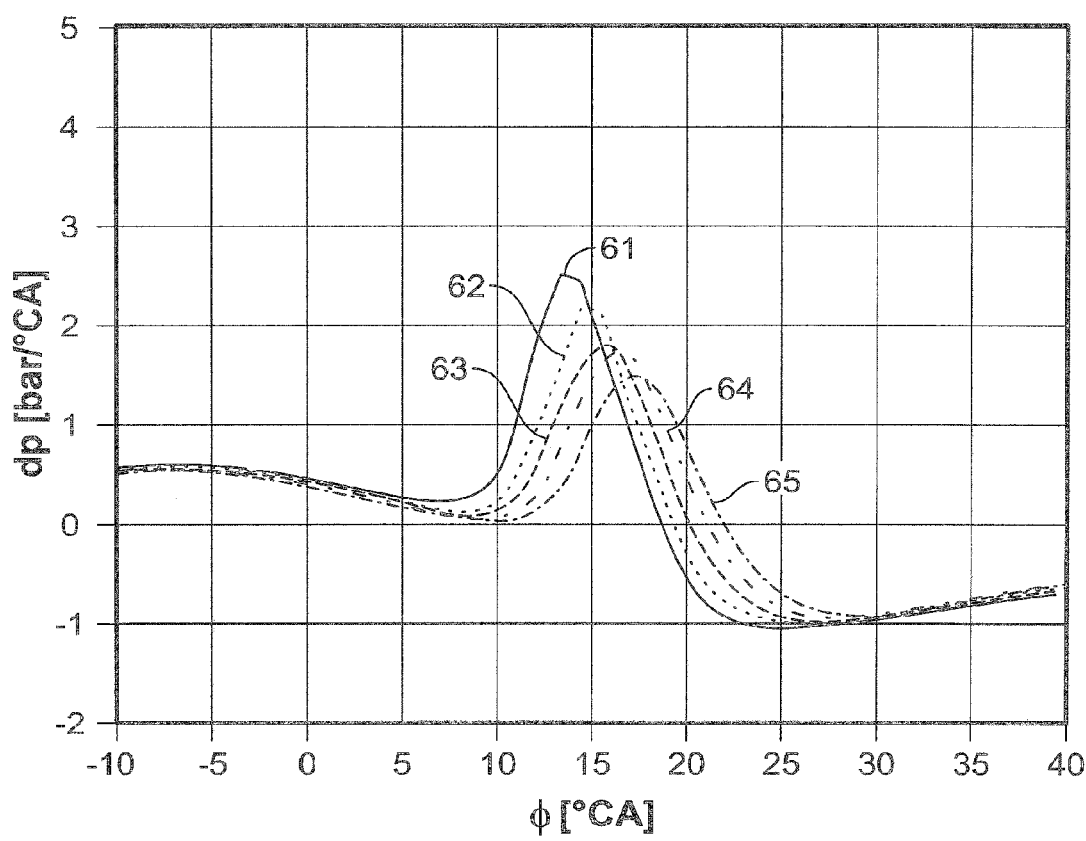
FIG. 4 shows an example coordinate system for representing a relationship between a combustion position and a combustion noise feature of a cylinder in a self-igniting internal combustion engine.

FIG. 4 shows a coordinate system for representing a relationship between a combustion position and a combustion noise feature of a cylinder in a self-igniting internal combustion engine. The abscissa of the coordinate system is a crankshaft angle Φ as measured from the upper dead center of the ignition. The ordinate of the coordinate system corresponds to a pressure gradient dp measured at crankshaft angle Φ. Pressure gradient dp is given as bar/° CA, in this instance.

In order to represent a relationship between a combustion position and a maximum pressure gradient $dp_{max}$ of a combustion cycle of a cylinder, we have plotted five graphs G1 to G5[1] in the coordinate system. All five graphs G1 to G5 have as combustion position a combustion center point MFB50 within a range between 7° CA and 11° CA after the upper dead center of the ignition.

The combustion cycle assigned to graph G1 has a combustion center point MFB50 at 7° CA and a maximum pressure gradient $dp_{max}$ at 2.9 bar/° CA. Additional graphs G2 to G5 correspond to combustion cycles having combustion center points MFB50 at 8° CA, at 9° CA, at 10° CA and at 11° CA. The corresponding maximum pressure gradients $dp_{max}$, at 2.5 bar/° CA, 2.1 bar/° CA, 2 bar/° CA and 1.1 bar/° CA, clearly lie below maximum pressure gradient $dp_{max}$ of graph G1.

In summary, one is able to determine that an early combustion position, or rather, an early combustion center point MFB50, leads to a clear increase in the maximum pressure gradient $dp_{max}$, and thus to a louder combustion noise. The control of a self-igniting internal combustion engine, taking into account the combustion noise feature, is therefore able to contribute to avoiding too early a combustion position. Taking into account the combustion noise feature therefore contributes to stabilizing the operation of the self-igniting internal combustion engine. In addition, the soft combustion noises increase driving comfort for the driver.

Figure 5:
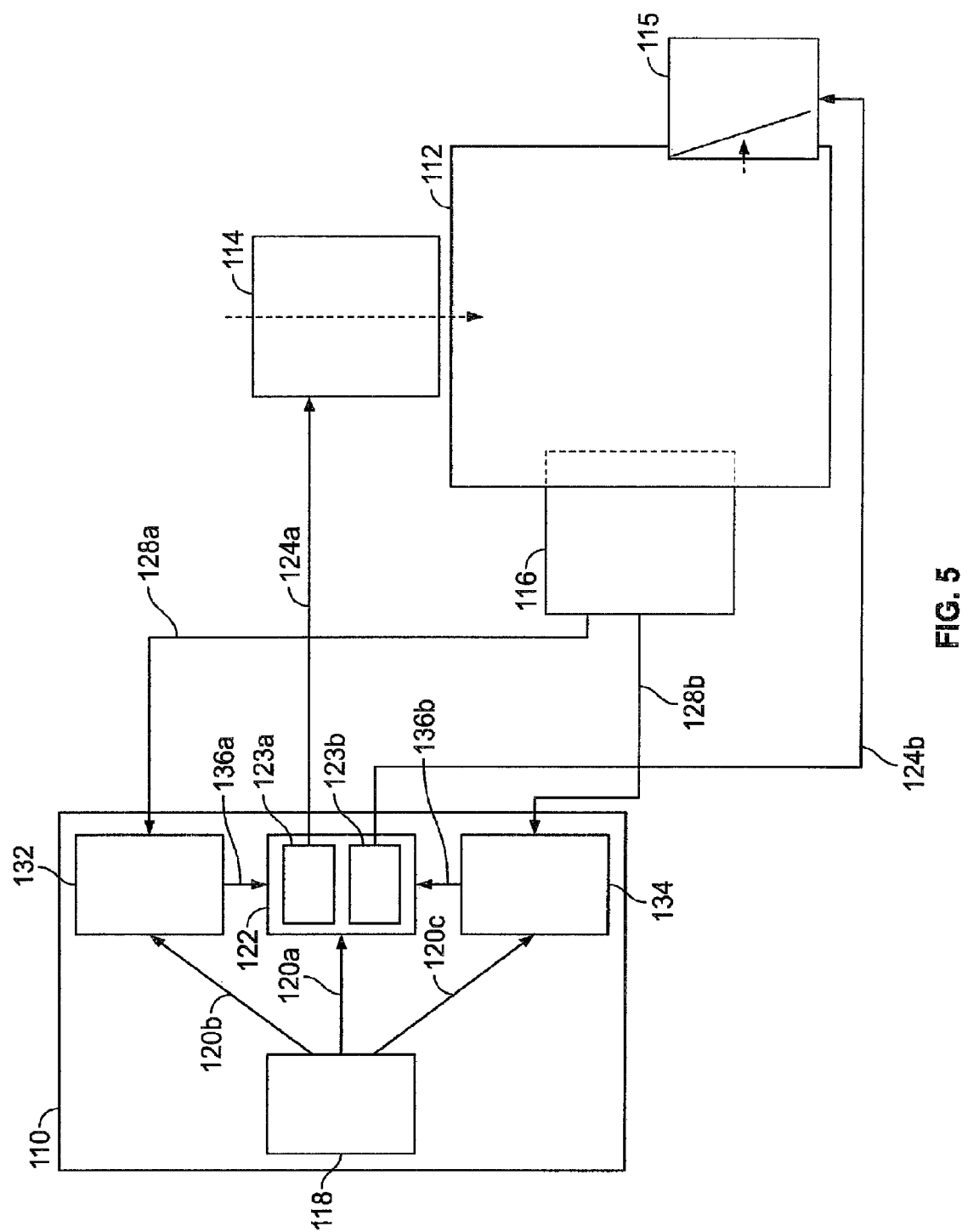
FIG. 5 is a schematic representation of an embodiment of the control device for operating a self-igniting internal combustion engine.

FIG. 5 shows a schematic representation of a second specific embodiment of the control device for operating a self-igniting internal combustion engine. Control device 110 shown here may be situated, correspondingly to the control device in FIG. 1, on a self-igniting internal combustion engine 112 of a vehicle having an injector 114, an exhaust gas valve 115 and a cylinder pressure sensor 116. Control device 110 has an output device 118 which is designed to make available two output values for a first injector control variable and/or air valve control variable and a second injector control variable and/or air valve control variable, while taking into account a rotational speed and/or a load of the traveling vehicle. The two injector control variables and/or the air valve control variables are output via a data signal 120a to an injector control device and air valve control device 122. The two injector control variables and/or air valve control variables are, for instance, an injection quantity of a pilot injection and/or a main injection, a total injection quantity, an injection position of the pilot injection and/or of the main injection, a closing time and/or opening time of injector 114, a closing time and/or opening time of exhaust gas valve 115, an opening duration of exhaust gas valve 115, an internal or external exhaust gas quantity, a closing and/or opening time of an air intake valve and/or an opening duration of an air intake valve.

Output device 118 is additionally designed to provide a setpoint combustion position and a setpoint combustion noise feature, while taking into account the rotational speed and/or the load. The setpoint combustion position is output via a data signal 120b to a first evaluation device 132. In the same manner, the setpoint combustion noise feature is provided as data signal 120c to a second evaluation device 134. We shall go into greater detail below on the functions of the two evaluation device 132 and 134.

The setpoint combustion position corresponds to a combustion position of self-igniting internal combustion engine 112. The setpoint combustion position may be, for example, a preferred combustion center point MFB50, a preferred combustion duration and/or an advantageous combustion starting point. The setpoint combustion noise feature is preferably made available as a variable which reflects the pressure characteristic on the inside of at least one cylinder of internal combustion engine 112. The setpoint combustion noise feature is advantageously the maximum pressure gradient during a combustion phase of a cylinder. Injector control device and air valve control device 122 includes an injector control unit 123a and an air valve control unit 123b. The two control units 123a and 123b are designed to control injector 114, exhaust gas valve 115 and/or an air supply valve (not sketched) of internal combustion engine 112 in such a way that the first and second injector control variables and/or air valve control variables, specified by output device 118, are maintained during at least one combustion cycle for at least one cylinder of internal combustion engine 112. Corresponding control signals 124a and 124b are output by control units 123a and 123b to devices 114 and 115 of internal combustion engine 112 controlled by them. Pressure sensor 116, that was mentioned above, is designed to measure a second characteristic of a pressure in at least one cylinder, during a combustion phase. Pressure sensor 116 also receives a current rotational speed of internal combustion engine 112 from a rotational speed sensor (not shown). Pressure sensor 116 thereupon ascertains an actual combustion position for at least one cylinder of internal combustion engine 112, and outputs this as sensor signal 128a to first evaluation device 132. Moreover, pressure sensor 116 ascertains an actual combustion noise feature, which is subsequently provided as sensor signal 128b to second evaluation device 134. The actual combustion noise feature may, for instance, be the maximum pressure gradient, which occure in a cylinder of internal combustion engine 112 during one combustion cycle. The actual combustion noise feature may, of course, also be a maximum pressure gradient averaged over a plurality of cycles, or an average value of the maximum pressure gradients of all cylinders of the internal combustion engine.

First evaluation device 132 compares the ascertained actual combustion position to the provided setpoint combustion position. If the actual combustion position deviates from the setpoint combustion position, first evaluation device 132 determines an updated value for the first injector control variable and/or the air valve control variable at which the deviation for a following combustion cycle is able to be compensated for. The value for the first injector control variable and/or the air valve control variable updated by first evaluation device 132 is output as output signal 136a to injector control variable and air valve control variable 122. Second evaluation device 134 is also designed to compare the actual combustion noise feature to the specified setpoint combustion noise feature. In this context, if second evaluation device 134 determines a difference between the actual combustion noise feature and the setpoint combustion noise feature, which is greater than a specified difference threshold value, an updated value for the second injector control variable and/or air valve control variable is ascertained, in order to equalize the difference between the actual combustion noise feature and the setpoint combustion noise feature. Using an output signal 136b, this newly ascertained value for the second injector control variable and/or the air valve control variable is provided to injector control device and air valve control device 122.

Control device 110 explained in FIG. 5 is designed to repeat the process described in the above sentences several times. The correction interventions preferably take place by control device 110 from cycle to cycle. Of course, the correction interventions may also be executed after a specified number of cycles. It is ensured in this way that internal combustion engine 112 is controlled over a longer period in such a way that a desired setpoint combustion position and an advantageous setpoint combustion noise feature are maintained almost constantly.

Figure 6:
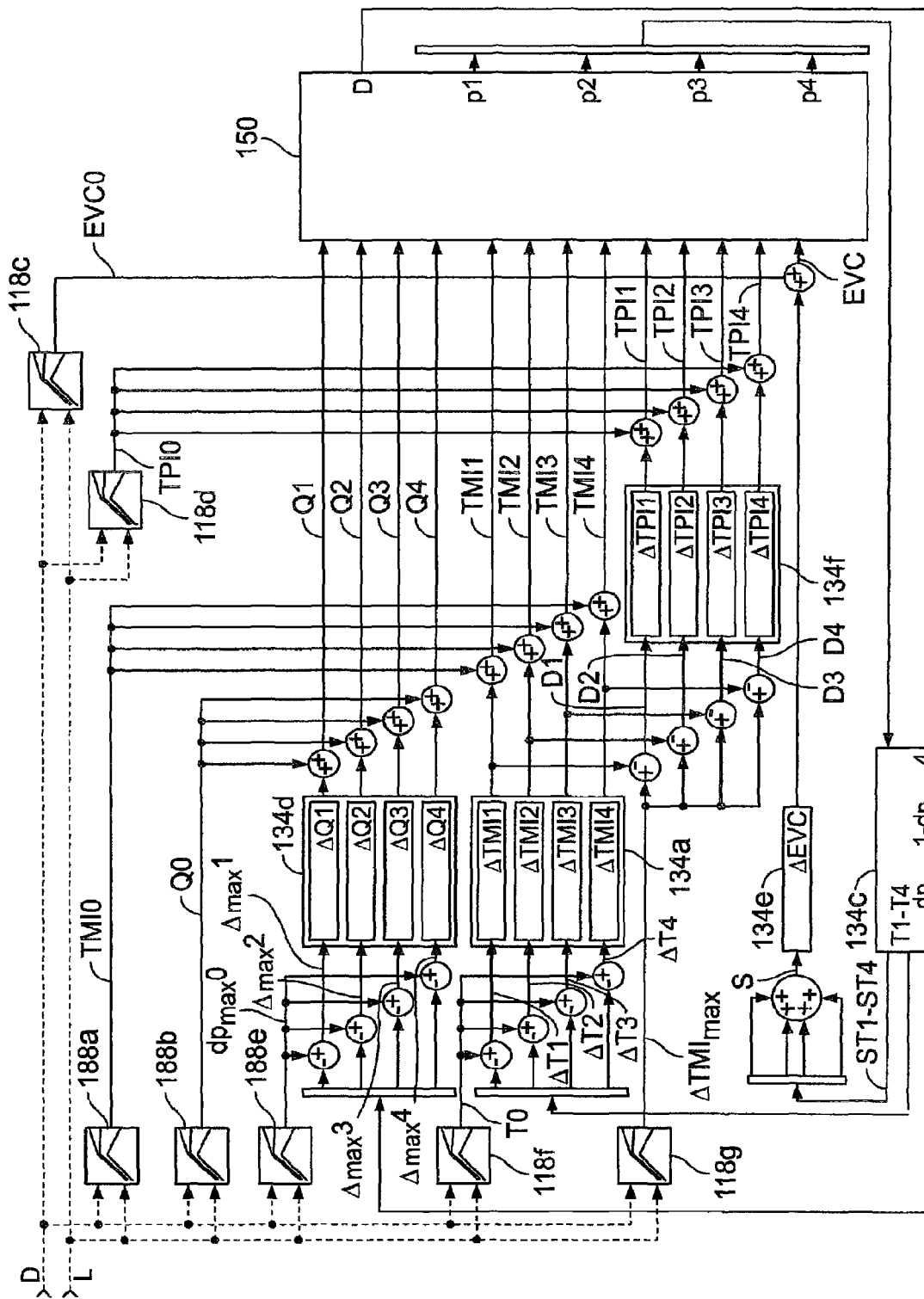
FIG. 6 is a block diagram of an embodiment of the method for setting a combustion position in operating a self-igniting internal combustion engine.

FIG. 6 shows a block diagram of a second specific embodiment of the method for setting a combustion position in operating a self-igniting internal combustion engine.

The specific embodiment is adapted, for instance, to a self-igniting internal combustion engine having four cylinders. The internal combustion engine is preferably an Otto engine. However, the method described here is limited neither to a specific number of cylinders nor to a specific type of self-igniting internal combustion engine.

At the beginning of the method, a rotational speed D and a load L of a vehicle is provided during travel to a vehicle-specific output device, which includes seven subunits 118a to 118g. The seven subunits 118a to 118g may be mounted on the vehicle as a compact unit or separately from one another. Subunits 118a to 118d output output values for controlling the self-igniting internal combustion engine, while taking into account rotational speed D and load L. As output values one might name initial injection position TM 10 for a main injection, an initial injection position TP10 for a pilot injection, an initial overall injection quantity Q0 for the main injection and the pilot injection and an initial exhaust gas valve closing time EVCO (exhaust valve closing). As an alternative or in supplement, other output values may, of course, be provided by additional subunits for controlling the self-igniting internal combustion engine.

Subunit 118e of the output device makes available a setpoint value $dp_{max}0$ for the maximum pressure gradient. Instead of setpoint value $dp_{max}0$ for the maximum pressure gradient, subunit 118e may also be designed to make available another setpoint combustion noise feature, such as a maximum loudness level of the combustion noise. In addition, subunit 118f of the output device outputs a setpoint combustion position T0, as a function of rotational speed D and load L.

Examples of such a setpoint combustion position T0 were mentioned above. Furthermore, subunit 118g is designed to output a maximum possible correction value $\Delta TMI_{max}$ for the injection position of the main injection. The exact function of the maximum possible correction value $\Delta TMI_{max}$ output by subunit 118g is discussed in greater tail below.

At the beginning of the method described here, correction values ΔQ1 to ΔQ4, ΔTMI1 to ΔTMI4, ΔTPI1 to ΔTPI4 and ΔEVC are set equal to zero. Subsequently, the initial overall injection quantity Q0 is added in each case to correction values ΔQ1 to ΔQ4, initial injection position TMI0 for a main injection is in each case added to correction values ΔTMI1 to ΔTMI4, initial injection position TPI0 for a pilot injection is added in each case to correction values ΔTPI1 to ΔTPI4 and initial exhaust gas valve closing time EVC0 is added to correction value ΔEVC. In this way one obtains operating values Q1 to Q4, TMI1 to TMI4, TPI1 to TPI4 and EVC for the first-time operation of engine control system 150 using a self-igniting internal combustion engine. The operating values Q1 to Q4, TMI1 to TMI4, TPI1 to TPI4 and EVC are the overall injection quantities, individually for each cylinder, Q1 to Q4, the injection positions, individually for each cylinder, TMI1 to TMI4 and TPI1 to TPI4 for the pilot injection and the main injection, and exhaust gas valve closing time EVC.

In the exemplary embodiment described here, only exhaust gas valve closing time EVC is not output individually for each cylinder. In a refinement of the embodiment, it is possible, however, also to specify exhaust gas valve closing time EVC individually for each cylinder.

Operating values Q1 to Q4, TMI1 to TMI4, TPI1 to TPI4 and EVC are output to an engine control system 150. Engine control system 150 is designed to control a (not shown) self-igniting internal combustion engine in such a way that specified operating values Q1 to Q4, TMI1 to TMI4, TPI1 to TPI4 and EVC are strictly maintained for at least one combustion cycle. Using a rotational speed sensor (not shown), a current value for rotational speed D is continually ascertained. A pressure sensor, that is also not shown, at the same time ascertains pressure characteristic p1 to p4, individually for each cylinder, during the combustion cycle in all four cylinders. Measured values D and p1 to p4, obtained in this manner, are subsequently output to a subunit 134c of an evaluation device. Subunit 134c of the evaluation device is designed to ascertain values, individually for each cylinder, for combustion positions T1 to T4 and for maximum pressure gradients $dp_{max}1$ to $dp_{max}4$, using measuring signals D and p1 to p4.

Combustion positions T1 to T4 of the individual cylinders are then deducted from provided setpoint combustion position T0, in order to determine deviations ΔT1 to ΔT4, individually for each cylinder, of the combustion positions of the individual cylinders. The deviations ΔT1 to ΔT4 are output to an additional subunit 134a of the evaluation device. Subunit 134a of the evaluation device includes four controllers which each ascertain a correction value ΔTMI1 to ΔTMI4 for the injection position, individually for each cylinder, of the main injection, while taking into account deviations ΔT1 to ΔT4.

Correction values ΔTMI1 to ΔTMI4, determined in this way, for the injection position of the main injection, are then added to initial injection position TMI0 for a main injection.

In this way, updated values come about for operating variables TMI1 to TMI4 that were mentioned above.

In a corresponding way, maximum pressure gradients $dp_{max}1$ to $dp_{max}4$, that were determined individually for each cylinder, are subtracted from setpoint value $dp_{max}0$ for the maximum pressure gradient, in order to calculate, individually for each cylinder, the deviations $\Delta_{max}1$ to $\Delta_{max}4$ from setpoint value $dp_{max}0$ for the maximum pressure gradient. Deviations $\Delta_{max}1$ to $\Delta_{max}44$ [sic; 4] are output to an additional subunit 134d of the evaluation device, which includes four controllers. Each controller of subunit 134d is designed to ascertain a correction value ΔQ1 to ΔQ4 for the overall injection quantity, while taking into account a deviation $\Delta_{max}1$ to $\Delta_{max}4$. Correction values ΔQ1 to ΔQ4 are then added to initial overall injection quantity Q0 for the main injection and the pilot injection, so as to obtain operating values Q1 to Q4. Subunit 134c, mentioned above, of the evaluation device is additionally designed to average over time combustion positions T1 to T4, individually for each cylinder, and to determine the standard deviation yielded by this of the actual values, individually for each cylinder. One thus obtains standard deviations ST1 to ST4, which are subsequently added to form a sum S. Sum S is output to a stability controller 134e of the evaluation device. Stability controller 134e ascertains the abovementioned correction value ΔEVC, using sum S that was provided to it. By the addition of correction value ΔEVC to initial exhaust gas valve closing time EVC0, an updated value is obtained for exhaust gas valve closing time EVC.

The method described in the above paragraphs is then repeated. Using the newly measured measuring values D and p1 to p4, in each case new operating variables Q1 to Q4, TMI1 to TMI4, TPI1 to TPI4 and EVC may be determined in the manner described above. The correction interventions in the injection system preferably take place from cycle to cycle. Since a correction intervention in the injection system has an effect on the combustion position, and, with that, on the maximum pressure gradient, the controllers in an embodiment are decoupled time-wise, whereupon the regulation for combustion positions T1 to T4 is designed to be clearly faster. Of course, the correction interventions in the injection system may also be performed to be slower, in a different specific embodiment.

In this context, it may happen that one of the correction values ΔTMI1 to ΔTMI4, ascertained individually for each cylinder, is equal to the abovementioned maximally possible correction value $\Delta TMI_{max}$ for the injection positions of the main injection, for instance, based on ageing effects in the internal combustion engine. Beginning at this maximally possible correction value $\Delta TMI_{max}$, the correction of the injection position of the main injection no longer contributes to the stabilization of the self-igniting internal combustion engine.

In order nevertheless to make possible a further run through the method described here, the evaluation device has a saturation controller 134f, whose four controllers are designed to ensure at least partially the correction of the injection position of the main injection, by using a correction of the injection position of the pilot injection. For this purpose, the correction values ΔTMI1 to ΔTMI4 are subtracted from the maximally possible correction value $\Delta TMI_{max}$ for the injection position of the main injection. The differences D1 to D4 obtained in this way are output to the controllers of saturation controller 134f of the evaluation device, which then ascertain the abovementioned correction values ΔTPI1 to ΔTPI4, while taking differences D1 to D4 into account. Correction values ΔTPI1 to ΔTPI4 are subsequently added to initial injection position TPI0 for the pilot injection. The result is operating variables TPI1 to TPI4. Stability controller 134e and saturation controller 134f are advantageous supplementations to a control device for operating a self-igniting internal combustion engine. However, a cost-effective specific embodiment of the control device is, of course, also possible without stability controller 134e and/or saturation controller 134f.

In closing, ascertained correction values ΔQ1 to ΔQ4, ΔTMI1 to ΔTMI4, ΔTPI1 to ΔTPI4 and ΔEVC of the various controller interventions could also be stored, as a function of the operating points, and could subsequently be used directly as corrections, individually for each cylinder, in the control of the internal combustion engine. This is particularly meaningful when the causes of the reference variable deviations are to be found in servive life effects.

Figure 7:
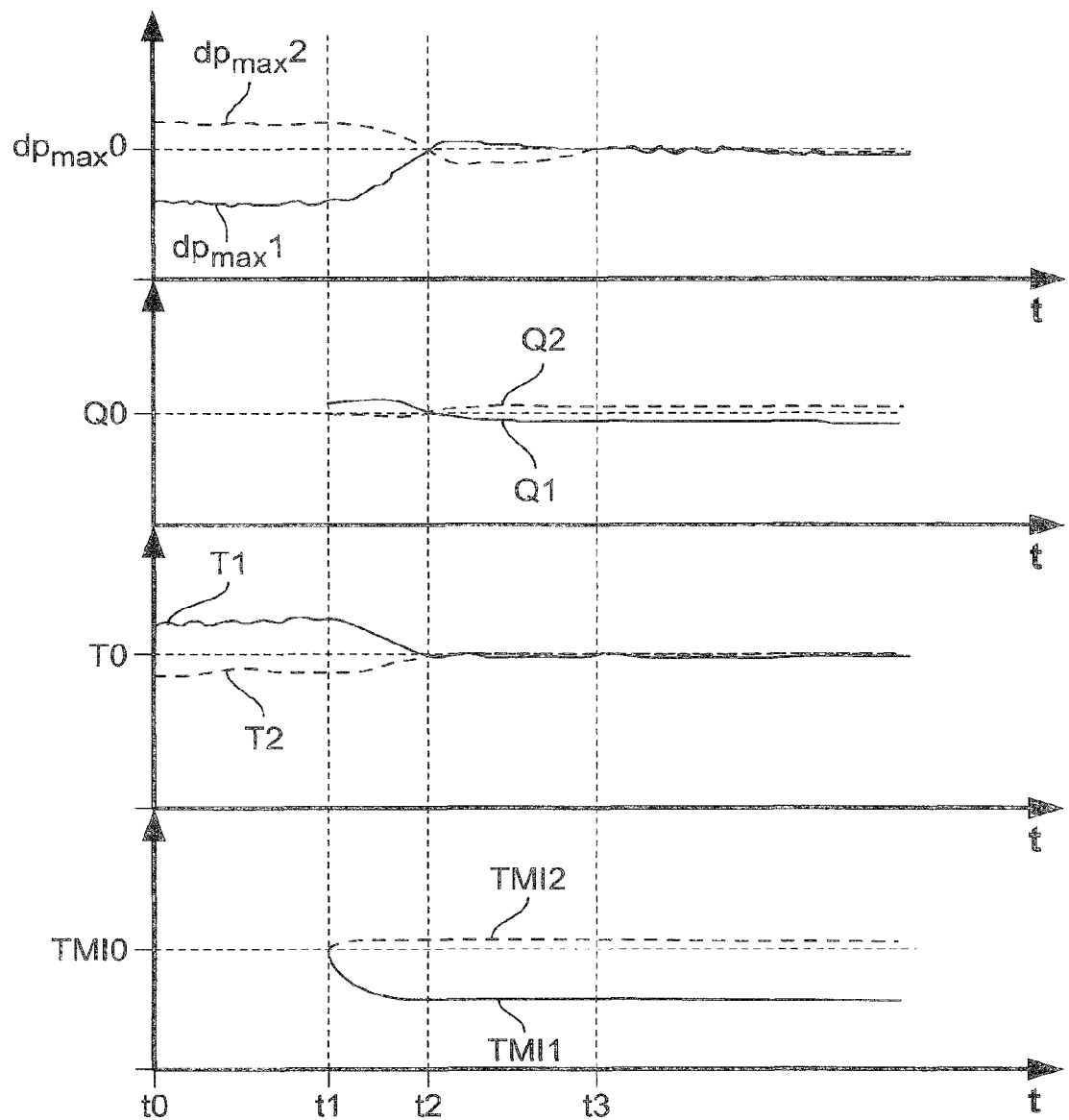
FIG. 7 shows an example coordinate system for a regulation of a combustion position and of a combustion noise according to the method embodiment of FIG. 6.

FIG. 7 shows a coordinate system as an example for the regulation of a combustion position and combustion noise according to the method in FIG. 6. The abscissa of the coordinate system is a time axis t. The ordinates of the coordinate system correspond to the value ranges of a maximum pressure gradient, an overall injection quantity, a combustion position and an injection position of a main injection of a combustion cycle.

A self-igniting internal combustion engine is started at time t0. For this purpose, an initial overall injection quantity Q0 and an initial injection position TMI0 are specified for the main injection, in the control system of the internal combustion engine. The initial overall injection quantity Q0 and the initial injection position TMI0 for the main injection are kept constant up to a time t1. At the same time, in two cylinders of the internal combustion engine, combustion positions T1 and T2 and the maximum pressure gradients $dp_{max}1$ and $dp_{max}2$ for each combustion cycle are ascertained in the time period between t0 and t1.

As may be seen with the aid of the coordinate system, combustion positions T1 and T2 clearly deviate from a specified setpoint combustion position T0 during the time period between t0 and t1. Maximum pressure gradients $dp_{max}1$ and $dp_{max}2$ also do not correspond to a desired maximum pressure gradient $dp_{max}0$ during this time period.

At point t1 the method, that was explained in light of FIG. 6, is started. In doing so, the regulation of maximum pressure gradients $dp_{max}1$ and $dp_{max}2$ is executed clearly more slowly than the regulation of combustion positions T1 and T2, in order to decouple the cross-influences between maximum pressure gradients $dp_{max}1$ and $dp_{max}2$ and combustion positions T1 and T2.

Up until a time t2, injection positions TMI1 and TMI2, individually for each cylinder, for the main injection, are corrected in such a way that the desired setpoint combustion position T0 is maintained by combustion positions T1 and T2.

Maximum pressure gradients $dp_{max}1$ and $dp_{max}2$, up to time t3, are also set in such a way that they no longer demonstrate any significant deviation from the desired maximum pressure gradient $dp_{max}0$. In this context, in the time interval between times t1 and t2, the changes in the maximum pressure gradients $dp_{max}1$ and $dp_{max}2$ are to be attributed almost exclusively to the corrections of overall injection quantities Q1 and Q2. The cross-influences of the two regulating interventions in combustion positions T1 and T2 and the maximum pressure gradients $dp_{max}1$ and $dp_{max}2$ should be recognized. The two control interventions, in this case, may be executed by evaluating the absolute values or the average values of the various cylinders.

Figure 8:
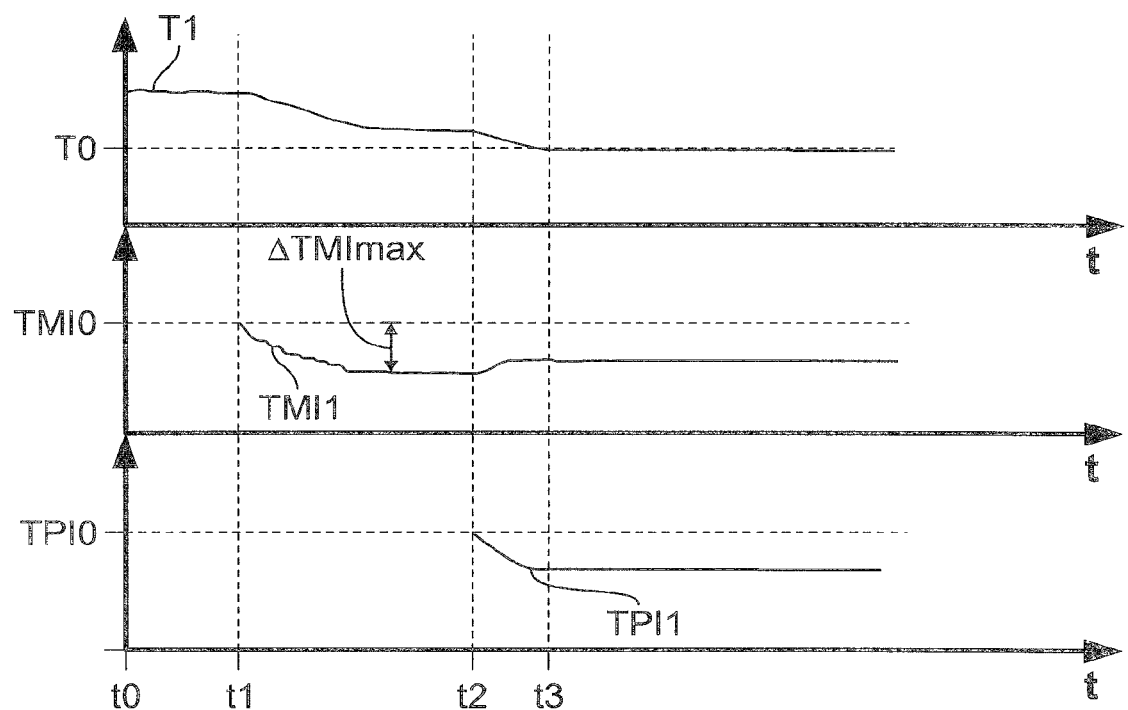
FIG. 8 shows an example coordinate system for a saturation regulation according to the method embodiment of FIG. 6.

FIG. 8 shows a coordinate system as an example of a saturation regulation according to the method of FIG. 6. The abscissa is a time axis t, corresponding to the coordinate system that was described above. The ordinate corresponds to the value ranges of a combustion position, an injection position of a main injection and an injection position of a pilot injection of a combustion cycle.

At a time t0, a self-igniting internal combustion engine is started, by making available at its control system an initial injection position TPI0 for the pilot injection and an initial injection position TMI0 for the main injection. The initial injection positions TPI0 and TMI0 are firmly maintained up to time t1 for one cylinder of the internal combustion engine. During the time period between times t0 and t1, the values determined as combustion position T1 of the cylinder deviate significantly from a specified setpoint combustion position T0.

Beginning at time t1, combustion position T1 is regulated using a correction of injection position TMI for the main injection, according to the method of FIG. 6. Values for injection position TMI are ascertained in this process which lie outside a threshold value $\Delta TMI_{max}$, about initial injection position TMI0 of the main injection quantity. In spite of the large deviations of ascertained injection position TMI from initial injection position TMI0 of the main injection quantity, one cannot succeed in setting combustion position T1 to setpoint combustion position T0.

In order nevertheless to correct combustion position T1 to values near setpoint combustion position T0, beginning at time t2, combustion position T1 is also corrected via an intervention in injection position TPI of the pilot injection, according to the method of FIG. 6. In this way it is possible to limit injection position TMI of the main injection to a value range which lies within threshold value $\Delta TMI_{max}$ about initial injection position TMI0 of the main injection quantity, and at the same time to correct combustion position T1 to values near setpoint combustion position T0. Based on the combined intervention in injection positions TMI1 and TPI1 of the main injection and the pilot injection, combustion position T1 shows no significant deviations from setpoint combustion position T0 as of time t3.

Alternatively or in addition to the intervention in injection positions TPI1 of the pilot injection the ratio of the injection quantities of the main injection and the pilot injection may also be varied, in order to level out combustion position T1 near setpoint combustion position T0.

Figure 9:
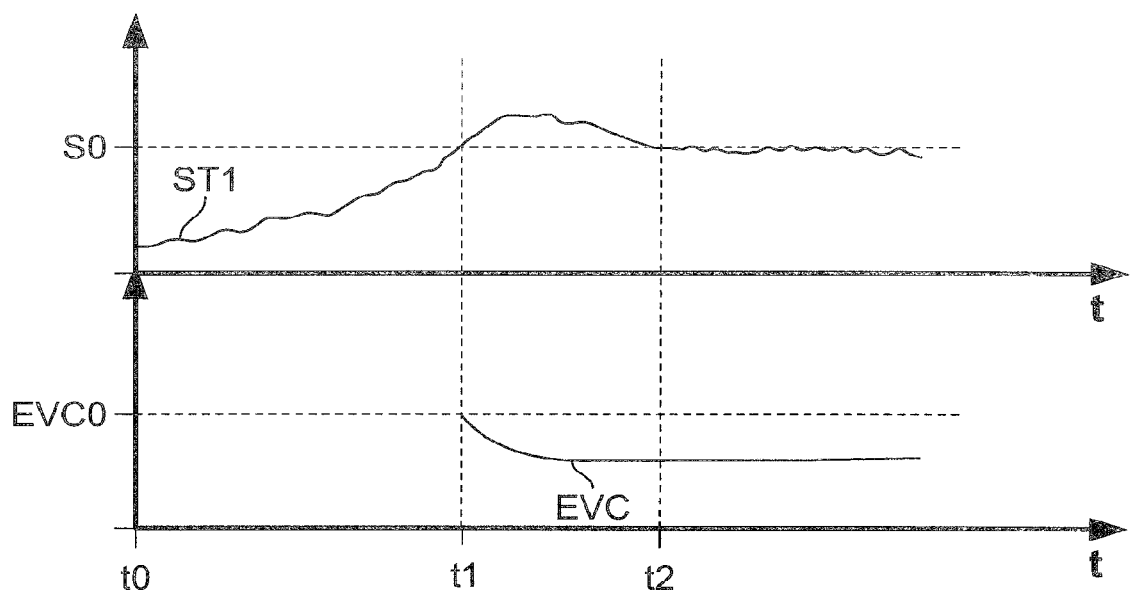
FIG. 9 shows an example coordinate system for a stability regulation of a standard deviation of a combustion position according to the method embodiment of FIG. 6.

FIG. 9 shows a coordinate system as an example for a stability regulation of a standard deviation of the combustion position, individually for each cylinder, according to the method in FIG. 6. The coordinate system has a time axis t as the abscissa. The ordinate of the coordinate system corresponds to the value ranges of one standard deviation and an exhaust gas valve closing time.

An output value EVCO is specified for the exhaust gas valve closing time, before the internal combustion engine is started at time t0. Beginning at time t0, the output value for the exhaust gas valve closing time EVCO is strictly maintained.

At the same time, a standard deviation ST1 for the combustion position of the cylinder is calculated from the continuously ascertained combustion positions of a cylinder of the internal combustion engine.

Based on environmental influences, fuel parameters (admixture of ethanol) and/or ageing effects in the internal combustion engine, standard deviation ST1 of the combustion position assumes ever higher values. At point t1, standard deviation ST1 exceeds a specified threshold value S0. In order to prevent this, the exhaust gas valve closing time EVC is set to a value at which threshold value S0 is maintained by standard deviation ST1 of the combustion position. Consequently, beginning at time t2, standard deviation ST1 of the combustion position again lies at or below threshold value S0.

In the stability regulation explained with the aid of FIG. 9, there may be an intervention, individually for each cylinder, (in response to a fully variable valve system) or an intervention, globally for all cylinders, (in response to a partially variable valve system). The intervention of the stability controller is used, in this instance, for reaching a maximum admissible standard deviation for the combustion position.

An embodiment of the present invention provides for a method for operating a self-igniting internal combustion engine (112), using the steps:

(a) specifying a setpoint combustion position (T0) and a setpoint combustion noise feature ($dp_{max}0$);

(b) operating at least one cylinder of the internal combustion engine (112) for at least one cycle while maintaining a specified first injector control variable and/or an air valve control variable (TMI1 to TMI4) and a specified second injector control variable and/or an air valve control variable (Q1 to Q4);

(c) ascertaining an actual combustion position (T1 to T4) and an actual combustion noise feature ($dp_{max}1$ to $dp_{max}4$) of the at least one cylinder;

(d) comparing the actual combustion position (T1 to T4) to the setpoint combustion position (T0) and, in case the actual combustion position (T1 to T4) deviates from the setpoint combustion position (T0), determining anew the first injector control variable and/or the air valve control variable (TMI1 to TMI4);

(e) comparing the actual combustion noise feature ($dp_{max}1$ to $dp_{max}4$) to the setpoint combustion noise feature ($dp_{max}0$) and, in case the actual combustion noise feature ($dp_{max}1$ to $dp_{max}4$) deviates from the setpoint combustion noise feature ($dp_{max}0$), determining anew the second injector control variable and/or the air valve control variable (Q1 to Q4). A further embodiment provides that a maximum pressure gradient ($dp_{max}1$ to $dp_{max}4$) in the at least one cylinder of the internal combustion engine (112) is determined as the actual combustion noise feature ($dp_{max}1$ to $dp_{max}4$). A further embodiment provides that the first injector control variable and/or the first air valve control variable (TMI1 to TMI4) includes an injection position (TPI1 to TPI4) of a pilot injection and/or an injection position (TMI1 to TMI4) of a main injection. A further embodiment provides additional steps of: specifying a third injector control variable and/or a third air valve control variable (TPI1 to TPI4); additional maintaining of the third injector control variable and/or the third air valve control variable (TPI1 to TPI4) in step (b); comparing the first injector control variable and/or the first air valve control variable (TMI1 to TMI4), determined anew in step (d), to a specified value range ($\Delta TMI_{max}$); and, if the newly determined first injector control variable and/or the first air valve control variable (TMI1 to TMI4) lies outside the specified value range ($\Delta TMI_{max}$), determining anew the third injector control variable and/or the third air valve control variable (TPI1 to TPI4). A further embodiment provides that the first injector control variable and/or the first air valve control variable (TMI1 to TMI4) is the injection position (TMI1 to TMI4) of the main injection and the third injector control variable and/or the air valve control variable (TPI1 to TPI4) includes the injection position (TPI1 to TPI4) of the pilot injection and/or a ratio of a pilot injection quantity and a main injection quantity. A further embodiment provides that the second injector control variable and/or the second air valve control variable (Q1 to Q4) includes the pilot injection quantity, the main injection quantity and/or the sum (Q1 to Q4) of the pilot injection quantity and the main injection quantity. A further embodiment provides the additional steps of: specifying an exhaust gas valve control variable (EVC); executing step (b) a plurality of times while additionally maintaining the exhaust gas valve control variable (EVC) and the step (c); determining at least one standard deviation (ST1 to ST4) from the actual combustion positions (T1 to T4) ascertained by executing the step (c) a plurality of times; comparing the at least one determined standard deviation (ST1 to ST4) and/or the sum of the determined standard deviations (ST1 to ST4) to at least one specified comparison value (S0); and in case the at least one determined standard deviation (ST1 to ST4) and/or the sum of the determined standard deviations (ST1 to ST4) deviates from the at least one specified comparison value (S0), determining anew the exhaust gas valve control variable (EVC). A further embodiment provides that the exhaust gas valve control variable (EVC) includes an exhaust gas valve opening time, an exhaust gas valve closing time (EVC), an exhaust gas valve opening duration, an internal exhaust gas quantity and/or an external exhaust gas quantity. The present invention also provides a corresponding control device for operating a self-igniting internal combustion engine.

An embodiment of the present invention provides a control device (110) for operating a self-igniting internal combustion engine (112) having an output device (118) which is designed to specify a setpoint combustion position (T0), a setpoint combustion noise feature ($dp_{max}0$), a first injector control variable and/or a first air valve control variable (TMI1 to TMI4) and a second injector control variable and/or a second air valve control variable (Q1 to Q4); an injector control device and/or an air valve control device (122), which is designed to control an injector (114) and/or an air valve (115) of the self-igniting internal combustion engine (112) in such a way that, during the operation of the internal combustion engine (112), for at least one cylinder and at least one cycle, the first injector control variable and/or the air valve control variable (TMI1 to TMI4) and the second injector control variable and/or the second air valve control variable (Q1 to Q4) are maintained; a first evaluation device (132) which is designed to receive an actual combustion position (T1 to T4) of the at least one cylinder, determined by a sensor (116), and to compare it to the specified setpoint combustion position (T0) and, in case the actual combustion position (T1 to T4) deviates from the setpoint combustion position (T0), to determine anew the first injector control variable and/or the first air valve control variable (TMI1 to TMI4); and a second evaluation device (134) which is designed to receive an actual combustion noise feature ($dp_{max}1$ to $dp_{max}4$), determined by a sensor (116), of the at least one cylinder, and to compare it to the specified setpoint combustion noise feature ($dp_{max}0$) and, in case the actual combustion noise feature ($dp_{max}1$ to $dp_{max}4$) deviates from the setpoint combustion noise feature ($dp_{max}0$), to determine anew the second injector control variable and/or the second air valve control variable (Q1 to Q4). In a further embodiment the self-igniting internal combustion engine (112) is an Otto engine.

What is claimed is:

1. A method for operating a self-igniting internal combustion engine, comprising:
   (a) specifying a setpoint combustion position and a setpoint combustion noise feature;
   (b) operating at least one cylinder of the internal combustion engine for at least one cycle while maintaining a specified first injector control variable and/or an air valve control variable and a specified second injector control variable and/or an air valve control variable;
   (c) ascertaining an actual combustion position and an actual combustion noise feature of the at least one cylinder;
   (d) comparing the actual combustion position to the setpoint combustion position and, in case the actual combustion position deviates from the setpoint combustion position, determining anew the first injector control variable and/or the air valve control variable;
   (e) comparing the actual combustion noise feature to the setpoint combustion noise feature and, in case the actual combustion noise feature deviates from the setpoint combustion noise feature, determining anew the second injector control variable and/or the air valve control variable.

2. The method as recited in claim 1, wherein a maximum pressure gradient in the at least one cylinder of the internal combustion engine is determined as the actual combustion noise feature.

3. The method as recited in claim 1, wherein the first injector control variable and/or the first air valve control variable includes an injection position of a pilot injection and/or an injection position of a main injection.

4. The method as recited in claim 3, further comprising:
   specifying a third injector control variable and/or a third air valve control variable;
   additional maintaining of the third injector control variable and/or the third air valve control variable in step (b);
   comparing the first injector control variable and/or the first air valve control variable, determined anew in step (d), to a specified value range; and,
   if the newly determined first injector control variable and/or the first air valve control variable lies outside the specified value range, determining anew the third injector control variable and/or the third air valve control variable.

5. The method as recited in claim 4, wherein the first injector control variable and/or the first air valve control variable is the injection position of the main injection and the third injector control variable and/or the air valve control variable includes the injection position of the pilot injection and/or a ratio of a pilot injection quantity and a main injection quantity.

6. The method as recited in claim 1, wherein the second injector control variable and/or the second air valve control variable includes the pilot injection quantity, the main injection quantity and/or the sum of the pilot injection quantity and the main injection quantity.

7. The method as recited in claim 1, further comprising:
   specifying an exhaust gas valve control variable;
   executing step (b) a plurality of times while additionally maintaining the exhaust gas valve control variable and the step (c);
   determining at least one standard deviation from the actual combustion positions ascertained by executing the step (c) a plurality of times;
   comparing the at least one determined standard deviation and/or the sum of the determined standard deviations to at least one specified comparison value; and
   in case the at least one determined standard deviation and/or the sum of the determined standard deviations deviates from the at least one specified comparison value, determining anew the exhaust gas valve control variable.

8. The method as recited in claim 7, wherein the exhaust gas valve control variable includes an exhaust gas valve opening time, an exhaust gas valve closing time, an exhaust gas valve opening duration, an internal exhaust gas quantity and/or an external exhaust gas quantity.

9. A control device for operating a self-igniting internal combustion engine, comprising:
   an output device which is designed to specify a setpoint combustion position, a setpoint combustion noise feature, a first injector control variable and/or a first air valve control variable and a second injector control variable and/or a second air valve control variable;
   an injector control device and/or an air valve control device, which is designed to control an injector and/or an air valve of the self-igniting internal combustion engine in such a way that, during the operation of the internal combustion engine, for at least one cylinder and at least one cycle, the first injector control variable and/or the air valve control variable and the second injector control variable and/or the second air valve control variable are maintained;
   a first evaluation device which is designed to receive an actual combustion position of the at least one cylinder, determined by a sensor, and to compare it to the specified setpoint combustion position and, in case the actual combustion position deviates from the setpoint combustion position, to determine anew the first injector control variable and/or the first air valve control variable; and
   a second evaluation device which is designed to receive an actual combustion noise feature, determined by a sensor, of the at least one cylinder, and to compare it to the specified setpoint combustion noise feature and, in case the actual combustion noise feature deviates from the setpoint combustion noise feature, to determine anew the second injector control variable and/or the second air valve control variable.

10. The control device as recited in claim 9, wherein the self-igniting internal combustion engine is an Otto engine.

* * * * *